United States Patent [19]

Takematsu

[11] 4,011,415
[45] Mar. 8, 1977

[54] CALL CIRCUIT FOR KEY TELEPHONE SYSTEM FOR GIVING DIRECT STATION SELECTION CALL PRIORITY OVER STATION CALL

[75] Inventor: Hikaru Takematsu, Tokyo, Japan

[73] Assignee: Iwatsu Electric Co., Ltd., Tokyo, Japan

[22] Filed: Mar. 3, 1976

[21] Appl. No.: 663,502

[30] Foreign Application Priority Data

Mar. 5, 1975 Japan .............................. 50-26734

[52] U.S. Cl. ........................ 179/99; 179/18 AD; 179/27 FE

[51] Int. Cl.² .......................................... H04M 1/00

[58] Field of Search ................ 179/99, 184 D, 1 H, 179/27 FE, 37; 307/130, 146, 259

[56] References Cited

UNITED STATES PATENTS

| | | | |
|---|---|---|---|
| 3,115,551 | 12/1963 | Plyer | 179/99 |
| 3,299,217 | 1/1967 | Burns | 179/99 |
| 3,541,268 | 11/1970 | Zucker | 179/18 AD |
| 3,787,640 | 1/1974 | Bush et al. | 179/99 |
| 3,898,392 | 8/1975 | Jackson | 179/99 |
| 3,904,834 | 9/1975 | Shinoi et al. | 179/99 |
| 3,927,278 | 12/1975 | Tsutsumi et al. | 179/99 |

*Primary Examiner*—Kathleen H. Claffy
*Assistant Examiner*—Gerald L. Brigance
*Attorney, Agent, or Firm*—Oblon, Fisher, Spivak, McClelland & Maier

[57] ABSTRACT

A first and a second power source have a predetermined potential difference at their outputs and supply direct currents to a station call line and a direct station selection call line respectively. A non-linear element is inserted between a point at which the station call line and the direct station selection call line are connected to each other and the first power source. When the direct station selection call is established, the non-linear element is turned off due to the potential difference between the first and the second power sources so that the direct station selection call is given priority over the station call.

3 Claims, 1 Drawing Figure

CALL CIRCUIT FOR KEY TELEPHONE SYSTEM FOR GIVING DIRECT STATION SELECTION CALL PRIORITY OVER STATION CALL

BACKGROUND OF THE INVENTION

1. Field of the Invention

This invention relates to a call circuit for key telephone systems and particularly to a call circuit for a key telephone system in which circuit a direct station selection (hereinafter referred to as DSS) call is given priority over a station call.

2. Description of the Prior Art

Heretofore, there have been provided relays which correspond to DSS call switches operable by an operator and which are capable of detecting the actuation of the switches. The break contacts of the relays are inserted in respective normal station call routes for telephones in order to give priority to a DSS call by the operator over a normal station call. However, this prior art attempt has the drawback that detector circuits equal in number to the number of telephones become necessary and hence the overall apparatus is complicated in construction and expensive to manufacture. Furthermore, the prior art apparatus is liable to be bulky and weighty.

SUMMARY OF THE INVENTION

It is therefore a principal object of the invention to provide a call circuit for giving priority to a DSS call over a station call, which call circuit is extremely simple in construction, small in size, light in weight, and inexpensive to manufacture.

The foregoing and other objects are attained in accordance with one aspect of the present invention through the provision of a call circuit which comprises a first powder source for a station call circuit and a second power source for a direct station selection call circuit, the power sources having a predetermined potential difference therebetween. A non-linear element is interposed between a point at which a station call line and a direct station call line are connected to each other and the first power source. When a direct station selection call is established, the non-linear element assumes its off state to block the transmission of the station call signal because of the output potential difference between the first and the second power source whereby the direct station selection call is given priority over the station call.

BRIEF DESCRIPTION OF THE DRAWING

Various objects, features and attendant advantages of the present invention will be more fully appreciated as the same becomes better understood from the following detailed description of the present invention when considered in connection with the accompanying drawing, in which:

The drawing shows a circuit diagram, partially in block form, of a preferred embodiment of the invention.

DETAILED DESCRIPTION OF A PREFERRED EMBODIMENT

Figure 1:
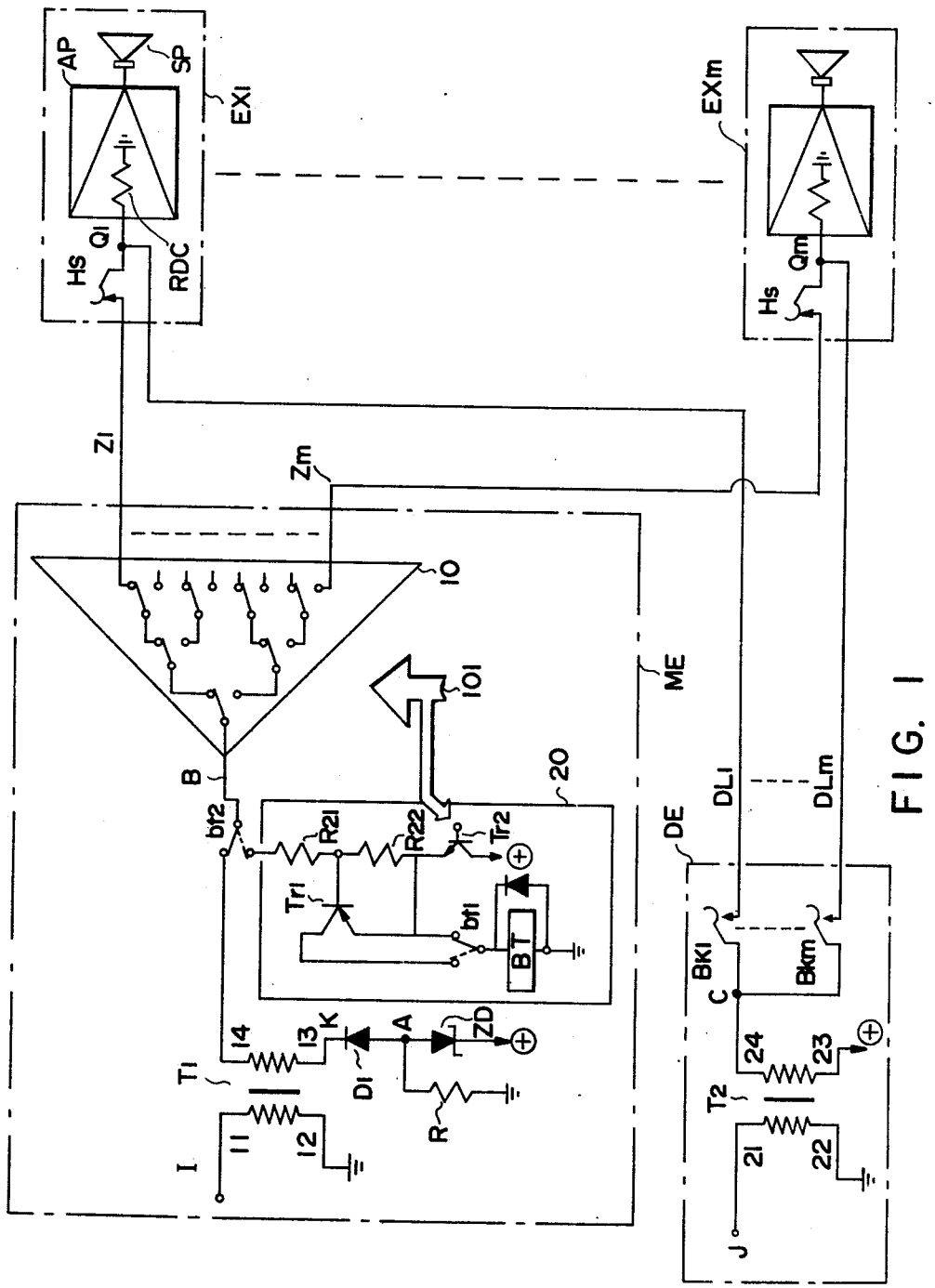

Referring now to the drawing, there is illustrated a call circuit for a key telephone system which can utilize the present invention. Basically, the call circuit comprises a station call circuit ME in a service unit of the key telephone system, conventional key telephones EX1-EX$m$, and a call circuit DE for a DSS device as disclosed in U.S. Pat. No. 3,299,217. Station call lines Z1 ... Z$m$ and DSS call lines DL1 ... DL$m$ are connected to each other at points Q1-Q$m$ in each key telephone EX1-EX$m$.

The station call circuit ME in the service unit includes a selection circuit 10 which is shown schematically, the selection circuit being adapted to connect a point B to the station call line which corresponds to a dialed extension number under the control of an unshown counter (the bold arrow 101). In the drawing, the point B is shown connected to a station call line Z1 which is connected with a key telephone EX1. A calling line occupation detector circuit 20 is provided to detect the call line use state of the called telephone. BT is a detector relay and bt1 and bt2 are relay contacts of the relay BT. There is provided a transformer T1 having a primary winding 11-12 to which a station calling signal I is applied. A secondary windings 13-14 of this transformer T1 has one end 14 connected via the contact bt2 to the point B and has the other end 13 connected to the cathode of a diode D1 which is provided in accordance with the invention. The anode of the diode D1 is connected via zener diode ZD with a first direct current power source ⊕. A resistor R has one end connected to a point A at which the diode D1 and the zener diode ZD are connected in series with one another. The other end of the resistor R is grounded.

The call circuit DE for the DSS device includes non-lock type DSS call key switches BF1 – BK$m$ which are provided corresponding to the conventional key telephones EX1 – EX$m$ and which are connected respectively at one end to the DSS call lines DL1 – DL$m$ which in turn correspond to the key telephones EX1 – EX$m$, respectively, and which are connected at the other end to a common point C. There is provided a transformer T2 having a primary winding 21-22 to which a DSS calling signal J is applied. A secondary winding 23-24 has one end 24 connected to the point C and the other end 23 connected to a second direct current power source ⊕.

The conventional key telephones EX1-EX$m$ are each provided with a hook switch HS which is adapted to be turned off when the telephone handset is lifted. The calling signal is applied to an amplifier AP which is operated by an electric current supplied upon connection with either the first DC power source through the station call signal line Z1 or the second DC power source through the DSS call line DL1. RDC and SP are a direct current equivalent resistance of the amplifier AP and a loudspeaker, respectively.

Upon termination of the call, the detector relay BT and the selection circuit 10 can be reset by the control signal 101 of the unshown service unit.

When the DSS call is to be established, an operator depresses a call key BK1, for example, which corresponds to a called telephone EX1, whereupon an electric current flows through the following route:

⊕ → T2(23-24) → BK1 → DL1 → RDC → ground

At this time, the amplifier AP is actuated and the calling signal J is coupled via the transformer T2 to this route and is amplified by the amplifier AP to operate the loudspeaker SP.

Next, let it be assumed that the operator makes a DSS call to a telephone at any time during the normal station call which is connected to the same telephone. In the drawing, assume that either the first and the second DC power sources have the same output potential or, instead, a common power source is employed therefor. A potential VA at the point A leading to the anode of the diode D1 is lower than the potential V+ of the first power source by the voltage drop across the zener diode ZD. This is substantially applicable to the situation where the telephone is not called since a direct current flows through the following route for stabilizing the operation of the system.

⊕ → ZD → R → ground

Assuming that the direct current resistance through K → T1(13–14) → Q1 and the direct current resistance through ⊕ → T2(23–24) → Q1 are zero for the purposes of facility of explanation and the potential at the point Q1 is the same as at the point K and VK > VA where VK is the potential at point K and VA is the potential at point A, the diode D1 is cut off and the station calling signal is blocked. Also, in the case where the direct current resistances noted above are considerably small in comparison with the resistance RDC, the voltage drop across the resistances is small and diode D1 may be reliably cut off. Therefore, by depressing the DSS call key switch, the station call is interrupted and the DSS call has priority thereover even over a station call which has been established.

When the DSS call is completed, the normal call is initiated automatically since the relay BT is held and for this reason prevention of release of the station call circuit is effected. Furthermore, when the DSS call is established first, the line designated as being in a busy condition if a station call attempt is made since the potential at the point Q1 is substantially the potential of the second power source and hence the relay BT is rendered nonoperative.

Where a common power source is used as in the drawing, the value of the reverse voltage which is to be applied for the cut-off of the diode D1 is determined by the peak value of the station call signal I which is induced in the secondary winding of the transformer T1 and can be established with ease by selecting values of the zener diode which cause the above-noted voltage drop VZD across the zener diode. Moreover, diodes which are connected in series with one another as necessary may be used instead of the foregoing zener diode ZD. Alternatively, another power source having a lower output potential than the power source ⊕ may be connected to the point A, and, in such case, the circuit comprising the zener diode ZD and the resistor R may be removed accordingly.

Although the diode D1 is used as the non-linear element, other circuit elements can be utilized. For instance, there may be used a transistor which has its base and emitter connected to each other and which therefore operates as a diode. Although the diode D1 is shown to be inserted between the first power source and the secondary winding of the transformer T1, it will readily occur to those skilled in the art that the diode D1 is not limited to this position but may be located anywhere between the first power source and the point Q. However, inserting the non-linear element between the points B and Q1 increases the required number of non-linear elements and is therefore not preferably. If the negative polarity of a power source is used, the diode D1 and the zener diode ZD must be reversely connected.

As described above, the present invention provides a simple circuit construction whereby a DSS call by the operator is given priority over the normal station call. Advantageously, the circuit of the invention is less costly to manufacture and is readily adaptable to practical use.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A call circuit for a key telephone system comprising:
    a direct station selection call circuit,
    a station call circuit,
    a first power source provided in the station call circuit for applying a direct current to a station call line,
    a second power source provided in the direct station selection call circuit for applying a direct current to a direct station selection call line;
    the first and second power sources having an output potential difference therebetween,
    a non-linear element disposed between the first power source and a point at which the station call line and the direct station selection call line are connected to each other so that the voltage difference permits the non-linear element to be cut off when a direct station selection call is established so that the direct station selection call is given priority over the station call.

2. A call circuit as defined in claim 1 wherein the non-linear element is a diode.

3. A call circuit as defined in claim 1 wherein the second power source comprises means for supplying power and the first power source comprises the means for supplying power connected to a zener diode biased in the reverse direction.

* * * * *